United States Patent [19]

Cleminson et al.

[11] 4,359,442
[45] Nov. 16, 1982

[54] PROCESS FOR THE TWIN-WEB HOT EMBOSSING OF THERMOPLASTIC FILM

[75] Inventors: John H. Cleminson, Orangeville; Brian R. Bowman, Milton; Raitis Lauge, Beaconsfield, all of Canada

[73] Assignee: Union Carbide Canada Limited, Toronto, Canada

[21] Appl. No.: 221,739

[22] Filed: Dec. 31, 1980

[30] Foreign Application Priority Data

Jan. 8, 1980 [CA] Canada ................................. 343284

[51] Int. Cl.³ ...................... B29C 17/00; B29C 25/00
[52] U.S. Cl. .................................. 264/280; 156/344; 264/210.1; 264/284
[58] Field of Search ............... 264/280, 284, 146, 248, 264/210.1; 156/344

[56] References Cited

U.S. PATENT DOCUMENTS

| 2,537,666 | 1/1951 | Gowing | 156/308.2 |
| 2,689,378 | 9/1954 | Muth et al. | 264/284 |
| 2,976,567 | 3/1961 | Jones et al. | 264/284 |
| 3,024,154 | 3/1962 | Singleton et al. | 264/284 |
| 3,196,062 | 7/1965 | Kristal | 264/284 |
| 3,573,153 | 3/1971 | Ryan | 156/308.2 |
| 3,810,729 | 5/1974 | Patchell | 264/284 |
| 3,849,050 | 11/1974 | Adams et al. | 425/363 |
| 3,950,480 | 4/1976 | Adams et al. | 264/284 |
| 3,966,383 | 6/1976 | Bussey, Jr. et al. | 425/388 |
| 3,977,153 | 8/1976 | Schrenk | 264/248 |
| 4,125,985 | 11/1978 | Laske | 156/306.3 |

FOREIGN PATENT DOCUMENTS

| 637607 | 3/1962 | Canada . |
| 756582 | 4/1967 | Canada . |
| 897921 | 4/1972 | Canada . |
| 1046716 | 1/1979 | Canada . |
| 1184072 | 12/1964 | Fed. Rep. of Germany ...... 264/284 |

OTHER PUBLICATIONS

Whittington, Whittington's Dictionary of Plastics, Technomic Pub. Co., Stamford, (1975) pp. 25, 29, 30, 221 & 251 relied on.

Primary Examiner—Willard E. Hoag
Attorney, Agent, or Firm—William G. Hopley; Albert E. Koller; James C. Arvantes

[57] ABSTRACT

A process for embossing a twin-web of film is described wherein a length of two superimposed webs of film are heated to a temperature above the vicat softening point, then passing the webs between a pair of embossing rolls at least one of which has an engraved surface which is sufficiently cooled to cool the webs to a temperature below the vicat softening point. The embossed webs are then passed into the nip of a pair of counter rotating driven rolls each having a high friction surface, separating the webs downstream of the nip by each of the webs maintaining contact with the surface of its respective driven roll, releasing each of the webs from its respective driven roll by continuing its passage over a cooperating pick-up or nip roll and then drawing each of the webs to separate wind-up stations.

5 Claims, 4 Drawing Figures

PROCESS FOR THE TWIN-WEB HOT EMBOSSING OF THERMOPLASTIC FILM

This invention relates to a process for simultaneously embossing two webs of film and subsequently separating the embossed webs. More particularly, it relates to a process of embossing a twin-web of film by heating the webs to a temperature above the vicat softening point, then embossing the twin-webs while cooling the webs to a temperature below the vicat softening point.

Embossed plastic films have come into widespread use in many applications such as in non-cloth disposable diapers and hospital bed underpads, protective coverings such as tablecloths, and wearing apparel such as aprons. These "personal products" films are embossed to provide aesthetic softness or "hand" characteristics. Often cloth-like aesthetic properties such as low gloss, softness, smoothness and limpness are imparted to thin polymeric films by embossing these films. The raised or indented patterns used are often repeating geometrical shapes such as squares, rectangles, circles, lines or diamonds with pattern counts greater than 20 repeats per inch of pattern distance. To obtain a close imitation of textile fabrics, the aforementioned geometrical patterns must be accurately duplicated in the polymeric film.

Heretofore embossed thermoplastic films have been made by various methods. One method is to extrude a film from a linear slot die onto a chill roll. The engraved pattern may be applied to the chill roll and the film pressed to the chill roll by press rolls. Alternatively the chill roll may be smooth and an embossing roll presses the film against the chill roll to obtain the desired pattern.

A second and different method of producing thin, flexible polymeric films is with the tubular blown film process. The tubular blown film process consists of extruding a tubular web from a circular die and cooling the web while containing a gas within the tubular envelope of polymeric film. The tubular film is flattened and is edge slit to produce two flat superimposed sheets. These sheets are routinely wound on two separate winding stations. These single rolls of film are then embossed in separate embossing stations non-related and independent of extrusion. Alternatively following tubular blown film extrusion and edge slitting, the two sheets are separated and individually embossed in at least two separate embossing stations in a process continuous with extrusion.

Embossing methods utilized for ensuring accurate pattern duplication start with the engraving of a metal cylindrical roller surface with the desired embossing pattern. The pattern is then duplicated on the thin polymeric film by introducing the thin film in a molten or softened state into tangent contact of the engraved roll with a secondary roll of either reversed geometry or of a resilient material. This forces the film to come into close contact with the engraved surface as the rolls counter-rotate. Simultaneously cooling of the polymer film below its softening point results in the embossed pattern being retained in the film. The single web entering the embossing station can consist of one or more individual layers of polymer which have been extruded from a single or multiple layer extrusion process. In these cases the polymers are a single web in entering and exiting the embossing station and are never separated. This process is referred to as single web hot embossing.

Another embossing method is the process by which one or more separate polymeric films are embossed at temperatures below their softening temperatures. This method, known as the cold embossing process, subjects the cold polymeric films to patterns engraved in matched metal rolls which counter-rotate; the patterns engraved in the rolls being reversed in profile from each other. The pattern is somewhat transferred to the cold film by the stresses induced into the film as it passes between the rolls. When more than one separate web is embossed using this cold embossing process, separate webs entering the embossing station can be readily separated after embossing by pulling the webs apart. Since there is no fusion between webs, as there would be in hot embossing, separation of the webs can be accomplished with little effort. However, the cold embossing process produces embossed films with pattern resolutions and sharpness which are significantly less than obtained through hot embossing. Also, the pattern definition is less permanent in cold embossing than in hot embossing.

In summary then, embossing processes operating at higher than the softening point of the thermoplastic are capable of giving the pattern definition and permanence required to impart aesthetic qualities, cloth and hand characteristics and other qualities required for use in so-called "personal products". These processes, so far, have been restricted to a single web per embossing unit, because of the previously mentioned tendency of multible webs to fuse together and hence tear when attempts are made to re-separate them after embossing.

It is therefore an object of one aspect of this invention to provide a process for hot embossing two overlying webs of film in a single embossing operation.

It is an object of another aspect of this invention to provide a process for embossing a twin-web of film and separating the embossed webs in an in-line continuous embossing process.

These and other objects are obtained by means of a process which comprises:

(a) passing a length of said film consisting of two superimposed webs into a heating zone to heat said webs to a temperature above the vicat softening point;

(b) passing said heated webs between a pair of embossing rolls at least one of which has an engraved metallic surface cooled to a temperature sufficient to cool said webs to below the vicat softening point;

(c) passing said webs into the nip between a pair of counter-rotating driven rolls, each having a high friction surface, separating said webs downstream of said nip by each of said webs maintaining contact with the surface of its respective driven roll downstream of said nip, passing each of said webs around a sufficient portion of the circumference of its respective driven roll and under sufficient tension to prevent slippage, releasing each of said webs from its respective driven roll by continuing passage over a co-operating pick-up or nip roll, then, (d) drawing each of said webs to a separate wind-up station.

Figure 1:
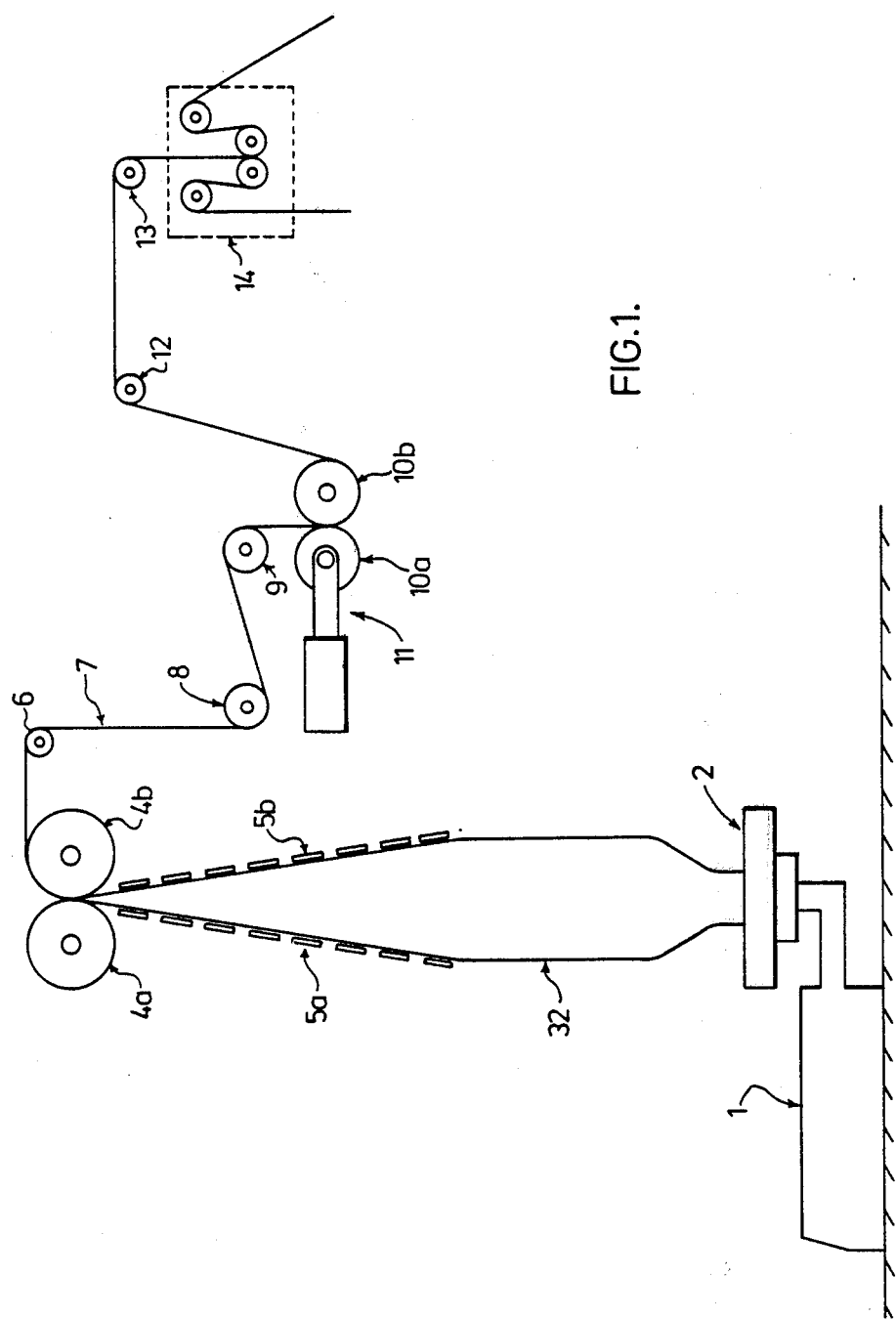
FIG. 1 is a schematic illustration of the apparatus for carrying out the process of the present invention.

The overall process is illustrated in FIG. 1 wherein thermoplastic material is extruded from extruder 1 through extruder head 2 and blown into a tubular film 3 in a manner well known in the art. The tubular film is drawn by nip rolls 4a and 4b after being collapsed by flattening frames 5a and 5b into a pair of superimposed webs of uncut tubular film. The film is passed over idler roll 6 and then slit along the edges at slitting station 7. The superimposed webs are drawn around heating rolls 8 and 9 to the embossing station whereby each of the webs are heated to a temperature above their vicat softening point yet the webs are not heated to such a degree that the twin-webs are fused together during the subsequent embossing step. The vicat softening temperature of plastics is taken to be defined as in the Annual Book of ASTM Standards, American Society for Testing and Materials, Philadelphia, Part 35, Designation D 1525-75, 1976. The web can also be heated by other means well known in the art.

The hot superimposed plastic webs are then fed into the embossing station consisting of rolls 10a and 10b. One of the rolls is an internally cooled metal roll 10b engraved with the desired pattern. By engraving is included embossing, sandblasting, metallizing, etching or other well known methods of embossing patterns. The other roll 10a can be a metal roll covered with a resilient material or a matching metal roll. Roll 10a is maintained in pressure contact with roll 10b by means of hydraulic system 11 or other pressure generating means. This roll 10a may be crowned for better pressure distribution according to known technology.

Both superimposed webs are simultaneously deformed into the shape of the engraved pattern on the metal roll 10b by pressure contact of the webs between the engraved roll 10b and mating roll 10a. Sufficient heat is removed from the web by the internal cooling system in the engraved roll 10b to lower the film temperature below its vicat softening point. This results in the freezing of the embossed pattern into the webs.

Figure 2:
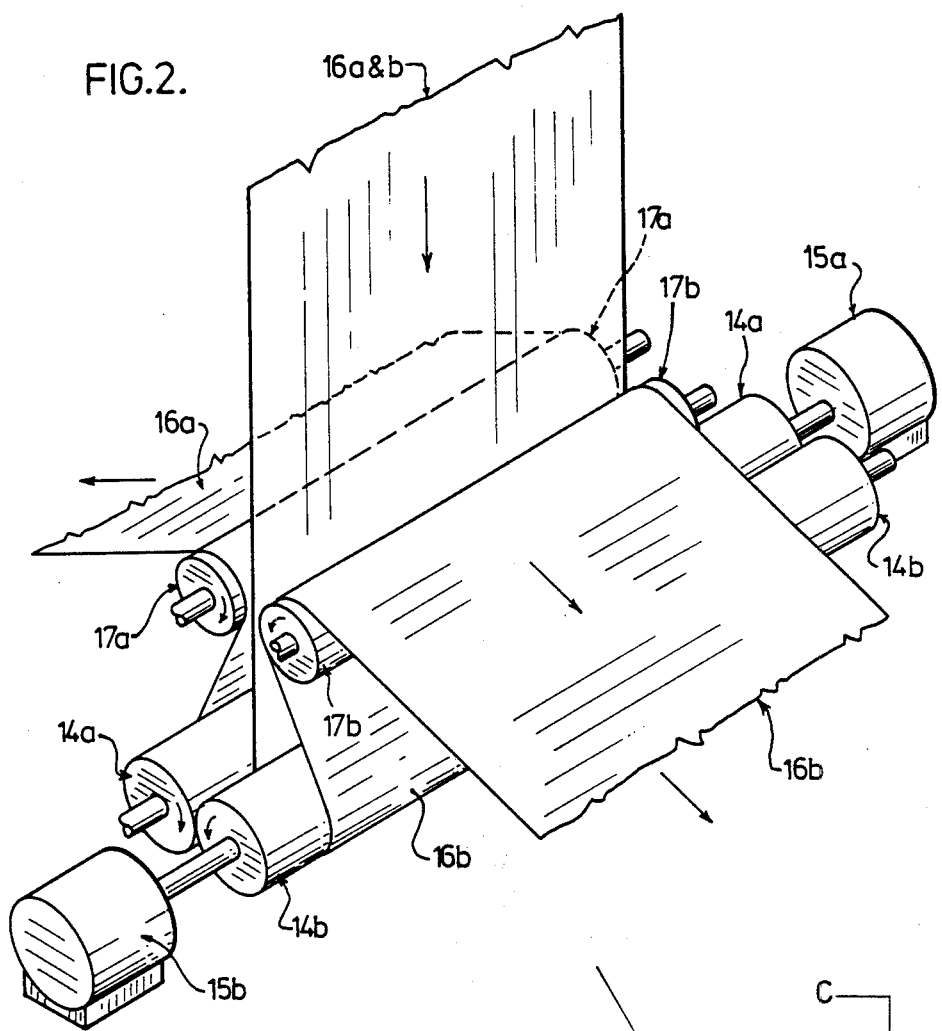
FIG. 2 is a perspective schematic illustration of the separating station shown within the broken-lined square of FIG. 1.

The superimposed twin webs are then directed over further idler rolls 12 and 13 and then into the separation station 14 shown within the broken-lined square of FIG. 1 and more particularly illustrated in FIG. 2.

As shown particularly in FIG. 2, the superimposed embossed twin-webs 16a and b are drawn down in the direction of the arrow into the nip between a pair of counter-rotating driven rolls 14a and 14b which are driven at such a speed as to maintain tension on the twin webs. Each of rolls 14a and 14b have a surface of high friction material such as rubber to provide a non-slipping contact between the web and its adjacent roll. The non-slipping contact is important for achieving separation of the webs without breakage or deterioration of the embossed pattern as it distributes the separation forces evenly along the width of each of the webs.

The embossed twin-webs are passed through the nip of driven rolls 14a and 14b and each of the webs maintains contact with the surface of its adjacent roll throughout a sufficient portion of the circumference of the roll and under sufficient tension so that the twin-webs are smoothly separated without tear or damage to the webs. In FIG. 2 web 16b is shown passing around driven roll 14b. Web 16a is passed around driven roll 14a in a similar manner.

Each of the released and separated webs are drawn up and over co-operating pick-up rolls 17a and 17b which rotate in the direction shown by the arrows. The pick-up rolls 17a and 17b are positioned above driven rolls 14a and 14b so that they aid in providing the maximum surface use of driven rolls 14a and 14b by directing the webs 16a and 16b around the surface of their respective roll. In cases where slippage occurs between the webs 16a and 16b and their respective rolls 14a and 14b, despite the separate webs being in contact with half or more of the circumference of their respective driven roll 14a and 14b, the pick-up rolls 17a and 17b can be moved down so that they co-operate with driven rolls 14 and 14b to form nips for the separated webs.

The separating station provides a positive action which is especially effective at high line speeds in excess of 200 ft/min. Usually at such speeds film web separation would be extremely difficult and would result in breakage and wrap-ups.

From the separating station each web is directed to either a wind-up station (not shown) or to a further treatment area such as for corona discharge, piercing as described in Canadian patent No. 975916, or other operations.

In FIG. 1, the extrusion, the twin-web hot embossing and the separation are done in line. This is only thus described for convenience as the extrusion, hot embossing, and separation can be done out of line.

Figure 3:
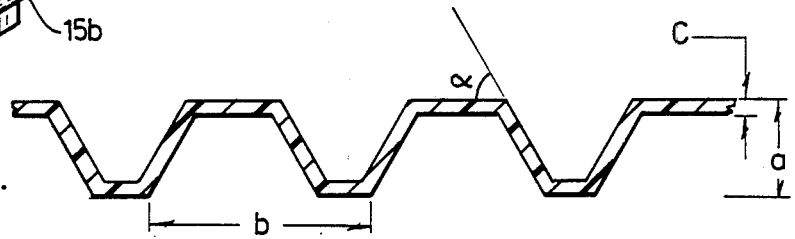
FIG. 3 is an enlarged sectional view of a web of embossed thermoplastic film.
Figure 4:
FIG. 4 is an enlarged sectional view of a twin-web of embossed film prepared by the process of the present invention prior to the separation of the webs.

In the extrusion process described above, a tubular film having a thickness prior to embossing of between 0.0005 and 0.005 inches and preferably between 0.00075 and 0.0015 inches is collapsed, slit and embossed as shown in FIG. 1. The resulting embossed twin-web prior to separation is shown in cross-section in FIG. 4. After separation of the webs the embossing remains on each web as shown in FIG. 3. The resulting individual webs are suitable as cloth-like barrier back sheets for disposable diapers or hospital incontinent pads or for other personal products. The thermoplastic material used for making the film can include certain additives or pigments to provide controlled opacity color or oxidative stability.

The embossing pattern can consist of various geometries including diamonds, squares, lines or hexagons. Cloth-like appearance and texture characteristics can be changed by the design of both planar and profile pattern geometry. The embossed patterns scatter the reflection of light which tends to lower the specular gloss of the embossed film. The depth of the engraved pattern depends upon several considerations, including the width of the top and bottom spaces between the pattern raised figures on the engraved roll, the strength of the plastic materials being embossed, the type of materials used on the resilient surface of the mating roll and pressures at the contact point of the embossing nip.

EXAMPLE

Polyethylene of density 9.918 g/cc and of vicat softening point 175° F. was extruded by the tubular blown film process wherein the resulting film had a thickness of 0.0012 inches. The tubular film was collapsed and edge slit to form a twin-web. The twin-web was heated to approximately 190° F. by contact with heater rollers. The twin-web was embossed at the nip between an engraved water-cooled steel roll and a 50 Shore A durometer hardness rubber mating roll at 350 pounds per linear inch nip pressure in order to achieve a bulking ratio of 3:1 where bulking ratio is defined as the ratio of a to c of FIG. 3. The hardness of the rubber is measured according to the American Society of Test Materials Procedure D 2240-75. While passing through the embossing rolls, the twin-web was cooled to a temperature below its vicat softening point. The temperature of the inlet cooling water to the interior of the engraved steel roll was approximately 50° F.

The embossed twin web was separated at the motorized separation station and the individual webs were subsequently corona discharge treated, slit to size, and reeled onto winders at a speed of 225 ft/min.

The embossing roll used in this example had an engraved pattern consisting of rows of truncated pyramids. This resulted in the pattern repeat length on the film of 0.029 inches as shown in (b) of FIG. 3. The truncated pyramids were arranged such that their base line on the film was at an angle of approximately 45° to the edge of the pyramid, as shown as angle α in FIG. 3.

We claim:

1. A process for embossing thermoplastic polyolefin film which comprises.
   (a) passing a length of said film consisting of two superimposed webs in direct face-to-face contact into a heating zone to heat said webs to a temperature above the vicat softening point but below the melting point of said film each of said webs being free from release agent coated on the interface surfaces of said superimposed webs;
   (b) passing the heated superimposed webs between a pair of embossing rolls at least one of which has an engraved metallic surface cooled to a temperature sufficient to cool said webs to below the vicat softening point;
   (c) passing said webs into the nip between a pair of counter rotating driven rolls, each having a high friction surface, separating said webs downstream of said nip by each of said webs maintaining contact with the surface of its respective driven roll, each having a high friction surface, separating said webs downstream of said nip by each of said webs maintaining contact with the surface of its respective driven roll downstream of said nip, passing each of said webs around a sufficient portion of the circumference of its respective driven roll and under sufficient tension to prevent slippage, releasing each of said webs from its respective driven roll by continuing passage over a co-operating roll, then;
   (d) drawing each of said webs to a separate wind-up station.

2. A process as claimed in claim 1 wherein said thermoplastic film is one selected from the group consisting of polyethylene, polypropylene and ethylene copolymers.

3. A process as claimed in claim 2 wherein each of said webs has a nominal thickness from 0.0005 to 0.005 inches and a bulking ratio in excess of 1.5.

4. A process as claimed in claim 3 wherein said pair of embossing rollers consists of a roll having an engraved metallic surface and a mating pressure roll having a surface of resilient material selected from the group consisting of rubber, paper and felt.

5. A process as claimed in claim 3 wherein said pair of embossing rollers consists of two engraved metallic rolls, one of said rolls having a positive engraved metal surface and the other roll having a complementary negative engraved surface.

* * * * *